United States Patent [19]

Yung et al.

[11] Patent Number: 4,994,809
[45] Date of Patent: Feb. 19, 1991

[54] POLYSTATIC CORRELATING RADAR

[75] Inventors: Kar W. Yung, Torrance; Donald C. D. Chang, Thousand Oaks; Samuel C. Reynolds, Los Angeles, all of Calif.

[73] Assignee: Hughes Aricraft Company, Los Angeles, Calif.

[21] Appl. No.: 490,032

[22] Filed: Mar. 7, 1990

[51] Int. Cl.⁵ ............................................. G01S 13/48
[52] U.S. Cl. .................................... 342/108; 342/463
[58] Field of Search ............... 342/465, 463, 108, 110, 342/113, 378, 136

[56] References Cited

U.S. PATENT DOCUMENTS

| | | | |
|---|---|---|---|
| 2,929,059 | 3/1960 | Parker | 342/156 X |
| 3,134,977 | 5/1964 | Takagi et al. | 342/378 |
| 3,154,778 | 10/1964 | Kock | 342/156 X |
| 3,812,493 | 5/1974 | Afendykiw et al. | 342/156 X |
| 3,889,266 | 6/1975 | Bartram | 342/465 |
| 4,208,659 | 6/1980 | Allezard | 342/107 X |
| 4,305,074 | 12/1981 | Barzana et al. | 342/156 X |
| 4,901,084 | 2/1990 | Huguenin et al. | 342/107 X |

OTHER PUBLICATIONS

Jacobson, M. J., "Analysis of a Multiple Receiver Correlation System", Journal of The Acoustical Society of America, vol. 29, No. 12, Dec. 1957, pp. 1342-1347.

Primary Examiner—Gilberto Barrón, Jr.
Attorney, Agent, or Firm—Robert A. Westerlund; Steven M. Mitchell; Wanda K. Denson-Low

[57] ABSTRACT

The polystatic correlating radar includes a plurality of radar receivers which receive a signal reflected from an object from one or more radar signal transmitters. Signals received from the plurality of receivers are cross correlated to provide high resolution of the angular location, range, and radial velocity measurements, as well as tangential velocity measurements for close targets.

14 Claims, 2 Drawing Sheets

POLYSTATIC CORRELATING RADAR

BACKGROUND OF THE INVENTION

1. Field of the Invention:

This invention relates generally to correlating radiometer techniques, in combination with standard radar techniques for providing high resolution angular location and range gating measurements, and more particularly relates to polystatic cross correlating radar techniques useful for object angular location, ranging, and radial velocity and tangential velocity measurements for close targets, useful for automotive collision avoidance radar, cruise control radar, and self-mobile robotic systems.

2. Description of Related Art:

In general, conventional radar devices include a transmitting antenna emitting electromagnetic radiation generated by an oscillator, a receiving antenna, and an energy detecting receiver. The receiver provides a received radar signal to a signal processing unit where the radar signals are processed to detect and identify the presence of a target, and to determine its location and radial velocity with respect to the receiver. Distance can be determined by measuring the time taken for the radar signal to travel to the target and to return. The direction, or angular location of the target may be determined by the direction of arrival of the received radar signal. Directional information is usually obtained with narrow antenna beams, and the radial velocity of the target with reference to the receiver can be measured by detecting shifts in the carrier frequency of the radar signal reflected from the target, commonly known as the Doppler effect. Continuous waveforms can be used to take advantage of the Doppler frequency shift, and frequency or phase modulation of the continuous waveform permits range measurements from the received radar signals.

Modern radar typically uses a common antenna for both transmitting and receiving, known as monostatic radar. A bistatic radar is one in which the transmitting and receiving antennae are separated by a given distance. In early experimental radar systems this was known as CW wave-interference radar. Such early experimental radar systems utilized continuous waveform (CW) radar signals, and depended for detection upon interference produced between the signal received directly from the transmitter and the Doppler frequency shifted signal reflected by a target.

When several separate receivers are employed with a signal transmitter, the radar system is known as multistatic, or polystatic radar. An essential feature of the bistatic or polystatic radar is that the radiated signal from the transmitter arrives at the receivers from the scattered path which includes the target, and is also directly correlated with the receiver in a direct path from the transmitter. Information from the transmitted signal allows extraction of information from the scattered signal. Thus, from the transmitted frequency, the Doppler frequency shift, and the phase or time shift may also be determined. Although a bistatic radar can be operated with either pulse modulation or continuous waveform energy, continuous wave radar requires considerable isolation between the transmitter and receiver, which is obtainable in a bistatic or polystatic radar because of inherent separation between the transmitter and receivers.

Continuous wave radar also may be used for determining range if a timing mark is applied to the CW carrier, permitting the time of transmission and time of return to be recognized. Such a timing mark is applied to the CW carrier, permitting the time of transmission and time of return to be recognized. Such a timing mark can be used for identifying the transmitted carrier as well. A widely used technique to allow a broad spectrum of radar and timing information is frequency modulation of the carrier (FM-CW).

Another conventional radar technique for obtaining information from a received radar signal is the process of range gating. Each range gate opens sequentially just long enough to sample the received signal corresponding to a different range of time corresponding to a distance of travel of the signal in space.

If the bandwidth of the receiver pass bank is wide compared with that of the received signal energy, extraneous noise is introduced, reducing the signal to noise ratio of the received signal. If the receiver bandwidth is narrower than the bandwidth of the received signal, noise energy is reduced, along with a considerable portion of the received signal energy. This also reduces the signal to noise ratio. A matched filter functions to maximize the output peak signal to mean noise ratio. A matched filter receiver can be replaced by a cross correlation receiver that performs the same operation. In a cross correlation receiver, an input signal is multiplied by a delayed replica of the transmitted signal, and the product is passed through a low pass filter to perform integration of the signal. It would be desirable to combine such radar techniques to permit high resolution location and range and radial velocity measurements, as well as tangential velocity measurements of a close target. The present invention addresses this need.

SUMMARY OF THE INVENTION

The present invention provides for a polystatic correlating radar for detecting and locating an object at close ranges. A plurality of radar receivers receive a signal reflected from the object from one or more radar signal transmitters. Signals received from the plurality of receivers are cross correlated to provide high resolution of the angular location, range, and radial velocity measurements, as well as tangential velocity measurements for close targets. The polystatic correlating radar of the invention can, for example, be used to implement a full performance collision avoidance/mitigation radar system. The system utilizes a polystatic radar front end to achieve high range and rate resolution, and to minimize false alarms.

Briefly, and in general terms, a polystatic correlating radar according to the invention includes at least one means for transmitting a radar signal, a plurality of radar receivers including means for range gating the received signal, means for cross correlating the radar signal received by the receivers, and signal processing means for determining the angular location and the radial range of the object. In a preferred embodiment, the receivers also include Doppler processing means, and the signal processing means includes means for determining the tangential velocity of the target.

Other aspects and advantages of the invention will become apparent from the following detailed description, and the accompanying drawings illustrating by way of example the features.

DETAILED DESCRIPTION OF THE PREFERRED EMBODIMENT

Figure 1:
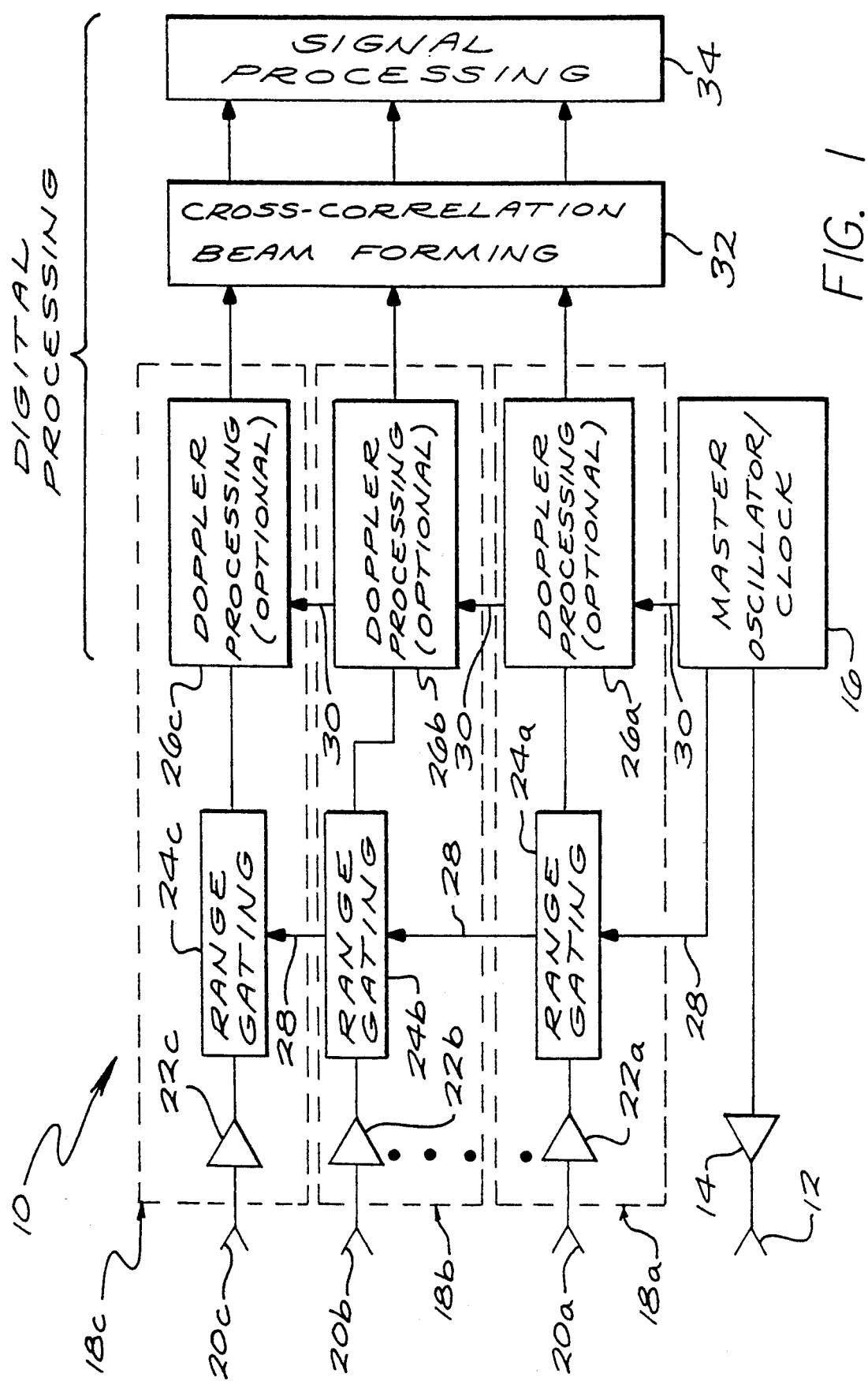
FIG. 1 is a schematic block diagram of a polystatic correlating radar system.

As is shown in the drawings for purposes of illustration, the invention is embodied in an apparatus and a method for detecting and locating an object by polystatic correlating radar. The object to be detected is illuminated with wave radiation which is reflected from the object to a plurality of receivers which include means for determining the range of the object from the receivers. Means are provided for correlation beam forming the radar signal received by the receivers to provide corrected signals between all of the receivers to obtain the angular location with a narrow beam response. A signal processing unit receives the corrected beam output to determine the angular location and radial range of the target, and in a preferred embodiment also to determine the tangential velocity of the target. Doppler processing is also provided in the preferred embodiment for determining the radial velocity. In a preferred embodiment, the correlation beam forming is performed by correcting the phase of the signal received from each of the receivers, determining the cross correlation products of the corrected signals between all of the elements, and summing of the cross correlation products to provide the corrected, cross correlated beam output. Further signal processing techniques may be optionally utilized in transmitting the radar signal, and on the cross correlated beam output for improvement of the detection and location of the target.

In accordance with the invention, there is therefore provided a polystatic correlating radar apparatus for detecting and locating an object, comprising at least one means for transmitting a radar signal; a plurality of radar signal receivers, including means synchronized with the transmitted radar signal for range gating a received radar signal for determining the range of the object from the receivers; means for cross correlating the radar signal received by each of the plurality of the receivers between each of the receivers to provide corrected received radar signals from all of the receivers; and signal processing means in electrical communication with the means for cross correlating the radar signals, for determining the angular location and the radial range of the object from the receivers.

The invention also provides for a method for correlating polystatic radar for detecting and locating an object, comprising the steps of transmitting a radar signal; receiving a radar signal reflected from said object at a plurality of receivers, and synchronizing with the transmitted radar signal for range gating each of said received radar signals; cross correlating the receiver signal output between each of said receivers; and signal outputs to determine the angular location and range of said object.

As is shown in the drawings, a polystatic correlating radar 10 includes one or more transmitters including a transmitter antenna 12, and a transmitter amplifier 14 for amplifying a radar signal received from a master oscillator and clock 16 for transmission by the transmitter antenna. Although conventional radar transmission frequencies may be used, one preferred radar carrier wave is electromagnetic energy having wavelengths from one centimeter to one millimeter, and frequencies from 30 GHz to 300 GHz. Millimeter waves are advantageous in having a large bandwidth, and in having a short characteristic wavelength, allowing a small antenna size. In addition, this region of the spectrum is not widely used. This reduces the likelihood of mutual interference between radar systems. Attenuation of millimeter waves in the atmosphere can also be advantageous in minimizing the probability of mutual interference between radar systems. Alternatively, other forms and spectra of electromagnetic energy may also be used, much as acoustic waves for sonar, which is useful in limited range operation.

The wave energy reflected from a target is received by a plurality of radar receivers 18a, 18b, 18c, each including a receiver antenna 20a, 20b, 20c, an amplifier 22a, 22b, 22c, and range gating circuitry 24a, 24b, 24c. Doppler signal processing circuitry 26a, 26b, 26c, may also be provided for determining radial velocity with respect to the receivers. In order to compare the transmission signals with the received signal for range gating, the master clock and oscillator is in electrical communication with the range gating circuitry via line 28 and in communication with the Doppler processing circuitry via line 30.

A cross correlation beam forming circuit 32 receives the output of the receivers for focusing the received radar signals and generating a map of objects in the field of the view, and is typically provided for in a digital processing unit. The function of the cross correlation beam forming circuitry 32 is further illustrated in FIG. 2, as will be explained further below. The map defined by cross correlated beam outputs from the cross correlation unit 32 is received by the signal processing unit 34, for general tracking, identification and determination of false alarms concerning the object. The signal processing unit is capable of generating a complete two or three dimensional map of objects in the field of view, including range, angular location, radial velocity, tangential velocity, and radar cross section information. A signal code may be utilized by the transmitter for identification purposes, which can be recognized by the signal processing unit as well.

Figure 2:
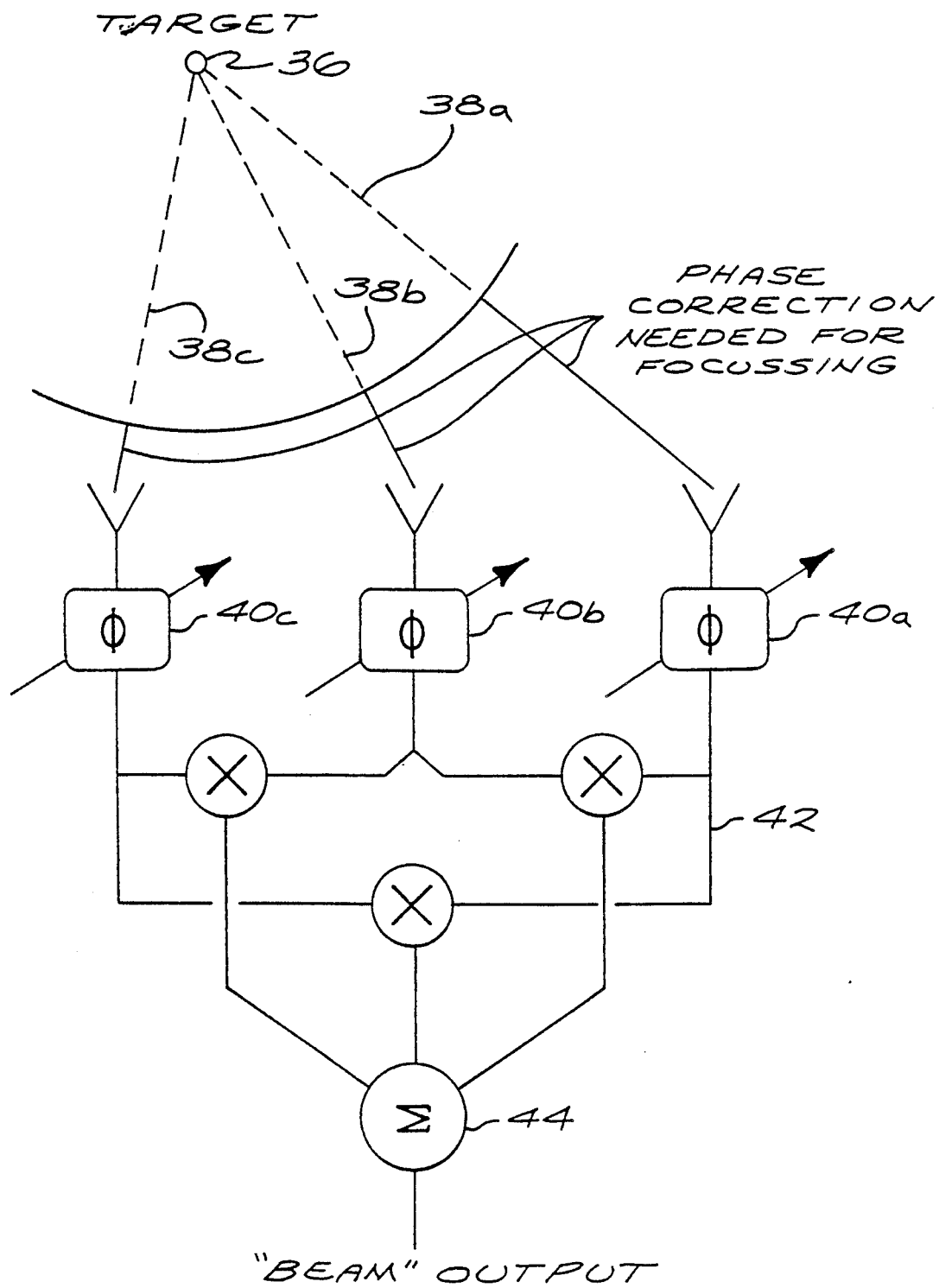
FIG. 2 is a block diagram illustrating the steps of cross correlating the received radar signals.

Referring to FIG. 2, the target 36 scatters the wave energy in the form of reflected radar beams 38a, 38b, 38c, to be received by the radar signal receiver units. In the preferred mode of the invention, the outputs of the multiple radar receivers are cross correlated to obtain a narrow beam response. This correlation beam forming process is performed for each angle at which resolution is desired. The cross correlation beam forming process consists of the steps of correcting the phase of the signal received from each receiver, based upon the desired focal point, either two or three dimensional. Additionally, the amplitude of the received signal may be corrected. The phase and amplitude of the received signals are corrected in the phase correction units 40a, 40b, 40c. The output from the phase correction units is cross correlated among all of the receiver phase correction units, as illustrated by the lines 42, and is directed to a summer 44 to sum all of the cross correlation products between each of the phase correction units.

As a result of the initial correction of the data of the focal point, this process is completely general, and is applicable to both far field and near field operation. If the radar system performs Doppler processing to determine range rate, the cross correlation beam forming process must be performed after the Doppler processing. The use of multiple receivers will generate multiple range rate measurements from various angles for any given target. Application of vector algebra in the signal processing unit will then yield an estimate of the tangential velocity, and thus of the total velocity vector, for that object. The accuracy of the tangential velocity estimate degrades with increasing range, since the angle between the several radial velocity measurements decreases with range. Thus, this determination is most accurate with close targets. Similarly, improved radial velocity resolution with respect to each receiver will improve the overall tangential velocity estimate.

It should be understood that the transmitter of the radar system can also provide additional scan capabilities. The correlation beam forming process typically generates significant grating lobes. The directional transmit beam is then used to cut off or eliminate all but one lobe (typically the center lobe) which is then scanned, by the cross-correlation beam forming unit, within the transmit coverage. However, if the transmit beam is then used to select an alternate correlation lobe, this alternate coverage will be scanned in place of the center lobe. Thus, a side total coverage is possible, at the expense of a small increase in transmitter complexity.

The transmit beam scanning may be accomplished by any of several means. Scanning may involve frequency scanning, and Butler-matrix beam forming, although other forms of scanning may also be used. Frequency scanning would require only a simple travelling wave antenna and a voltage controlled local oscillator, which would be shared by the transmit and receive portions of the radar system. The Butler-matrix approach involves a complexity of hardware, but involves simply changing feed ports to select alternate transmit coverage.

In view of the foregoing, it has been demonstrated that the polystatic correlating radar of the invention is advantageous in providing improved resolution to obtain narrow beam response, and for providing a close range radar system, which can provide not only angular location, range, and radial rate information, but also tangential velocity information about the target.

Although a specific embodiment of the invention has been described and illustrated, it is clear that it is susceptible to numerous modifications and adaptations within the ability of those skilled in the art and without the exercise of the inventive faculty.

Thus, it should be understood that various changes in form, detail and use of the present invention may be made without departing from the spirit and scope of this invention.

We claim:

1. A polystatic correlating radar apparatus for detecting and locating an object, comprising at least means for transmitting a radar signal;
   a plurality of radar signal receivers, including means for correlating said transmitted radar signal with a received signal for range gating said received radar signal for determining the range of said object from said receiver;
   means for cross correlating the radar signal received by each of said plurality of said receivers with each said receiver to provide corrected received radar signals from all of said receivers;
   signal processing means in electrical communication with said means for cross correlating said radar signals, for determining the angular location and the radial range of said object from said receivers;
   wherein said signal processing includes means for determining the tangential velocity of said object relative to said receivers.

2. The apparatus of claim 1, wherein said means for cross correlating includes means for correcting the phase of the signal received from each of said receivers, means for determining the cross correlation product of the corrected signals between all of the receivers, and means for summing said cross correlation products to provide a corrected receiver signal, whereby said polystatic correlating radar apparatus is enabled to determine the angular location with a narrow beam response.

3. The apparatus of claim 1, wherein each of said radar receivers includes means for determining a Doppler frequency shift of said receiver signal.

4. The apparatus of claim 1, wherein said means for transmitting a radar signal includes means for scanning the frequency; of said transmitted radar signal.

5. A method for correlating polystatic radar for detecting and locating an object, comprising the steps of:
   transmitting a radar signal;
   receiving said radar signal reflected from said object at a plurality of receivers, and range gating said received radar signal from each of said receivers;
   cross correlating the receiver signal output between each of said receivers; and
   processing said cross correlated receiver outputs to determine the angular location and range of said object;
   further including the step of determining the tangential velocity of said object responsive to said cross correlated receiver output.

6. The method of claim 5, wherein said step of cross correlating said receiver signal outputs comprises correcting the phase of said signals received from each of receivers to focus said received signals, determining the cross correlation product of the corrected signals between each of said receivers, and summing said cross correlation products to determine the angular location with a narrow beam response.

7. The method of claim 5, further including the step of determining the Doppler frequency shift of said received radar signal from each of said receivers.

8. The method of claim 5, wherein said step of transmitting includes scanning said transmitted radar signal.

9. The method of claim 5, wherein said step of transmitting further includes the step of beam shaping said transmitted radar signal.

10. The method of claim 5, wherein said step of transmitting a radar signal comprises illuminating said object with millimeter wave radiation.

11. The method of claim 5, wherein said step of transmitting comprises identifying said transmitted radar signal with a signal code.

12. The method of claim 11, wherein said step of receiving further includes identifying a transmitted signal from characteristics of said signal code.

13. The method of claim 5, wherein said step of cross correlating said receiver outputs includes the step of processing said received signals with said transmitted radar signal to select a lobe of said received radar signals and to substantially eliminate other lobes of the signal.

14. The method of claim 5, wherein said step of determining the tangential velocity of said object comprises sequentially determining the location of said object and determining tangential velocity by vector algebra.

* * * * *